(12) United States Patent
Oku et al.

(10) Patent No.: US 7,946,723 B2
(45) Date of Patent: May 24, 2011

(54) BACKLIGHT DEVICE

(75) Inventors: Takashi Oku, Saitama (JP); Takeo Arai, Saitama (JP); Yutaka Ota, Kanagawa (JP); Yasuhiro Tagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 11/667,397

(22) PCT Filed: Oct. 24, 2005

(86) PCT No.: PCT/JP2005/019523
§ 371 (c)(1),
(2), (4) Date: Jul. 11, 2008

(87) PCT Pub. No.: WO2006/051683
PCT Pub. Date: May 18, 2006

(65) Prior Publication Data
US 2008/0285268 A1 Nov. 20, 2008

(30) Foreign Application Priority Data

Nov. 9, 2004 (JP) .............................. P2004-325661

(51) Int. Cl.
*G09F 13/04* (2006.01)
(52) U.S. Cl. ..... 362/97.3; 362/97.1; 362/231; 362/97.2; 349/69; 349/68
(58) Field of Classification Search ........ 362/97.1–97.4, 362/230–231; 349/68–69; 313/500; 345/82
See application file for complete search history.

(56) References Cited

U.S. PATENT DOCUMENTS

| 5,093,765 | A | * | 3/1992 | Kashima et al. | |
|---|---|---|---|---|---|
| 5,477,422 | A | * | 12/1995 | Hooker et al. | |
| 5,786,665 | A | | 7/1998 | Ohtsuki et al. | |
| 6,481,130 | B1 | | 11/2002 | Wu | |
| 6,508,564 | B1 | * | 1/2003 | Kuwabara et al. | ............ 362/612 |
| 6,566,689 | B2 | | 5/2003 | Hoelen et al. | |

(Continued)

FOREIGN PATENT DOCUMENTS

EP 1496488 A1 * 1/2005

(Continued)

*Primary Examiner* — Robert May
(74) *Attorney, Agent, or Firm* — Wolf, Greenfield & Sacks, P.C.

(57) ABSTRACT

Disclosed is a backlight device for illuminating a transmissive color liquid crystal display panel from its backside with white light. The backlight device includes, as a light source, a plural number of principal light emitting diode units $21_{mn}$, and a plural number of subsidiary light emitting diode units $21_{mn}$, where m and n are natural numbers. Each principal light emitting diode unit is made up by a plural number of light emitting diodes (21) arrayed in a string and emits white light of preset chromaticity. Each subsidiary light emitting diode unit is made up by a plural number of light emitting diodes (21) arrayed in a string and emits white light of chromaticity in the vicinity of the preset chromaticity. The number of the subsidiary light emitting diode units is smaller than that of the principal light emitting diode units. When the principal light emitting diode units and the subsidiary light emitting diode units are arrayed in a two-dimensional matrix, the subsidiary light emitting diode units $21_{mn}$ are arrayed without being juxtaposed on the same row, and the subsidiary light emitting diode units $21_{mn}$, arrayed in a center column of the two-dimensional matrix, are arrayed towards the center of a color liquid crystal display panel (110).

4 Claims, 11 Drawing Sheets

U.S. PATENT DOCUMENTS

| | | | |
|---|---|---|---|
| 6,608,614 B1 * | 8/2003 | Johnson | 345/102 |
| 6,700,634 B2 * | 3/2004 | Taniguchi et al. | |
| 6,923,548 B2 * | 8/2005 | Lim | 362/612 |
| 7,002,546 B1 * | 2/2006 | Stuppi et al. | 345/102 |
| 7,093,971 B2 * | 8/2006 | Yu et al. | |
| 2003/0137615 A1 | 7/2003 | Nakayoshi et al. | |
| 2004/0000867 A1 | 1/2004 | Chen | |
| 2004/0218388 A1 * | 11/2004 | Suzuki | 362/231 |
| 2005/0007516 A1 * | 1/2005 | Hong et al. | |
| 2008/0024696 A1 | 1/2008 | Arai | |
| 2008/0055928 A1 | 3/2008 | Arai | |
| 2008/0284942 A1 * | 11/2008 | Mahama et al. | |

FOREIGN PATENT DOCUMENTS

| | | |
|---|---|---|
| GB | 2393845 A | 4/2004 |
| JP | 63-10103 A * | 1/1988 |
| JP | 3-208087 A * | 9/1991 |
| JP | 6-301034 A | 10/1994 |
| JP | 09-145934 A | 6/1997 |
| JP | 11-212479 A | 8/1999 |
| JP | 2001-222242 A | 8/2001 |
| JP | 2002-109936 A | 4/2002 |
| JP | 2002-131743 A | 5/2002 |
| JP | 2004-006317 A * | 1/2004 |
| JP | 2004-520695 A | 1/2004 |
| JP | 2004-191490 A | 7/2004 |
| JP | 2004-193049 A | 7/2004 |
| JP | 2004-287226 A | 10/2004 |
| JP | 2004-311353 A | 11/2004 |
| JP | 2005-044756 A | 2/2005 |
| JP | 2005-117023 A * | 4/2005 |
| JP | 2005-148731 A * | 6/2005 |
| JP | 2005-196989 A | 7/2005 |
| JP | 2005-228623 A | 8/2005 |
| JP | 2005-327682 A | 11/2005 |
| KR | 2004-0064245 A | 7/2004 |
| WO | WO 02-090826 A1 | 11/2002 |
| WO | WO 2004031647 A1 * | 4/2004 |
| WO | WO 2004-055429 A1 | 7/2004 |

* cited by examiner

BACKLIGHT DEVICE

TECHNICAL FIELD

This invention relates to a backlight device for illuminating a color liquid crystal display panel. More particularly, it relates to a backlight device in which a number of light emitting diode units, used as a light source for the backlight device, and which emit white light exhibit variations in chromaticity and luminance, are properly arrayed such as to suppress the variations in chromaticity and luminance.

The present application claims priority rights on the basis of the Japanese Patent Application 2004-325661, filed in Japan on Nov. 9, 2004. The contents of these Patent Applications are to be incorporated by reference in the present application.

BACKGROUND ART

A TV receiver of an extremely thin thickness, such as one employing a liquid crystal display (LCD) or a plasma display panel (PDP), has been developed and put to practical use to take the place of a TV receiver employing a cathode ray tube (CRT) which has long been used since the start of TV broadcasting. In particular, a color liquid crystal display apparatus employing a color liquid crystal display panel is expected to become popular at a high pace because it permits driving with low power consumption and the large-sized color liquid crystal display panel has become less expensive.

As for the color liquid crystal display apparatus, the backlight system, in which a transmissive color liquid crystal display panel is illuminated from its backside with a backlight device to display a color picture, is in the mainstream. The light source preferentially used for the backlight device, are CCFLs (Cold Cathode Fluorescent Lamps), emitting white light using fluorescent tubes.

Since the CCFL is a fluorescent tube, charged with mercury, it may be hazardous to environment. For this reason, a demand is raised for a light source which will take the place of the CCFL. As the light source to take the place of the CCFL, a light emitting diode (LED) is felt to be promising. With the development of the blue LED, the light emitting diodes emitting light of three prime colors, namely red color light, green color light and blue color light, are now in order. With the use of the light emitting diodes, color light beams displayed via color liquid crystal display panel become high in color purity. Hence, the color reproducing range may be expected to be as wide as a range prescribed by the NTSC system, or even wider.

DISCLOSURE OF THE INVENTION

In general, the light emitting diode is a light emitting device suffering significant variations in both chromaticity and luminance. For this reason, if the light emitting diodes, available on the market, are used at random to constitute a light source for a backlight device, the result is a backlight device exhibiting undesirable light emitting characteristics, such as low uniformity in chromaticity (severe chromaticity variations) or low uniformity in luminance (severe luminance variations).

It is therefore an object of the present invention to solve the above problem and to provide a backlight device which, even in case a light source is constituted with the use of light emitting diodes, suffering from variations in chromaticity and luminance, to avoid wasteful non-use of the light emitting diodes fabricated and available on the market, radiates white light free from variations in chromaticity or luminance, and which may be used satisfactorily as the illuminating light for the color liquid crystal display panel.

According to the present invention, there is provided a backlight device for illuminating a transmissive color liquid crystal display panel with white light from its backside surface. The backlight device includes, as a light source, a plurality of first principal light emitting device strings, each of which is a string of a plurality of light emitting devices emitting white light of preset luminance and preset chromaticity, a plurality of second principal light emitting device strings, each of which is a string of a plurality of light emitting devices emitting white light of luminance lower than the preset luminance and preset chromaticity, a plurality of first subsidiary light emitting device strings, each of which is a string of a plurality of light emitting devices emitting white light of the preset luminance and chromaticity in the vicinity of the preset chromaticity, and a plurality of second subsidiary light emitting device strings, each which is a string of a plurality of light emitting devices emitting white light of luminance lower than the preset luminance and chromaticity in the vicinity of the preset chromaticity. The number of the second principal light emitting device strings is smaller than that of the first principal light emitting device strings. The number of the first subsidiary light emitting device strings is smaller than that of the first principal light emitting device strings, and the number of the second subsidiary light emitting device strings is smaller than that of the first subsidiary light emitting device strings. When the first principal light emitting device strings, second principal light emitting device strings, first subsidiary light emitting device strings and the second subsidiary light emitting device strings are arrayed in a one-dimensional matrix pattern in the vertical direction of the color liquid crystal display panel, with the horizontal direction of the color liquid crystal display panel being a longitudinal direction, the first subsidiary light emitting device strings are arrayed towards the center of the color liquid crystal display panel, based on chromaticity, while the second principal light emitting device strings are arrayed towards the rim of the color liquid crystal display panel, based on luminance. The second subsidiary light emitting device strings are arrayed towards the center of the color liquid crystal display panel, based on chromaticity, or towards the rim of the color liquid crystal display panel, based on luminance.

According to the present invention, there is also provided a backlight device for illuminating a transmissive color liquid crystal display panel with white light from its backside surface. The backlight device includes, as a light source, a plurality of first principal light emitting device strings, each of which is a string of a plurality of light emitting devices emitting white light of preset luminance and preset chromaticity, a plurality of second principal light emitting device strings, each of which is a string of a plurality of light emitting devices emitting white light of luminance lower than the preset luminance and preset chromaticity, a plurality of first subsidiary light emitting device strings, each which is a row of a plurality of light emitting devices emitting white light of the preset luminance and chromaticity in the vicinity of the preset chromaticity, and a plurality of second subsidiary light emitting device strings, each of which is a string of a plurality of light emitting devices emitting white light of luminance lower than the preset luminance and chromaticity in the vicinity of the preset chromaticity. The number of the second principal light emitting device strings is smaller than that of the first principal light emitting device strings. The number of the first subsidiary light emitting device strings is smaller than that of the first principal light emitting device strings, and the number of the second subsidiary light emitting device strings is smaller than that of the first subsidiary light emitting device strings. When the first principal light emitting device strings, second principal light emitting device strings, first subsidiary light emitting device strings and the second subsidiary light emitting device strings are arrayed in a two-dimensional matrix pattern, with the horizontal direction of the color liquid crystal display panel being the longitudinal direction, the first subsidiary light emitting device strings are arrayed without being juxtaposed on the same row, based on chromaticity, while the first subsidiary light emitting device strings, arrayed at center columns of the two-dimensional matrix, are arrayed towards the center of the color liquid crystal display panel. The second principal light emitting device strings are arrayed towards the rim of the color liquid crystal display panel, based on luminance. The second subsidiary light emitting device strings are arrayed towards the center of the color liquid crystal display panel, without being juxtaposed on the same row, based on chromaticity; or are arrayed towards the rim of the color liquid crystal display panel, based on luminance.

According to the present invention, there is also provided a backlight device for illuminating a transmissive color liquid crystal display panel with white light from its backside surface. The backlight device includes, as a light source, a plurality of principal light emitting device strings, each of which is a string of a plurality of light emitting devices emitting white light of preset chromaticity, and a plurality of subsidiary light emitting device strings, each of which is a string of a plurality of light emitting devices emitting white light of chromaticity in the vicinity of the preset chromaticity. The number of the subsidiary light emitting device strings is smaller than that of the principal light emitting device strings. When the principal light emitting device strings and the subsidiary light emitting device strings are arrayed in a one-dimensional matrix pattern in the vertical direction of the color liquid crystal display panel, with the horizontal direction of the color liquid crystal display panel as the longitudinal direction, the subsidiary light emitting device strings are arrayed towards the center of the color liquid crystal display panel.

According to the present invention, there is also provided a backlight device for illuminating a transmissive color liquid crystal display panel with white light from its backside surface. The backlight device includes, as a light source, a plurality of principal light emitting device strings, each of which is a string of a plurality of light emitting devices emitting white light of preset chromaticity, and a plurality of subsidiary light emitting device strings, each of which is a string of a plurality of light emitting devices emitting white light of chromaticity in the vicinity of the preset chromaticity. The number of the subsidiary light emitting device strings is smaller than that of the principal light emitting device strings. When the principal light emitting device strings and the subsidiary light emitting device strings are arrayed in a two-dimensional matrix pattern, with the horizontal direction of the color liquid crystal display panel as the longitudinal direction, the subsidiary light emitting device strings are arrayed without being juxtaposed in the same row. The subsidiary light emitting device strings, arrayed in center columns of the two-dimensional matrix, are arrayed towards the center of the color liquid crystal display panel.

According to the present invention, there is also provided a backlight device for illuminating a transmissive color liquid crystal display panel with white light from its backside surface. The backlight device includes, as a light source, a plurality of principal light emitting device strings, each of which is a string of a plurality of light emitting devices emitting white light of preset luminance, and a plurality of subsidiary light emitting device strings, each which is a string of a plurality of light emitting devices emitting white light of luminance lower than the preset luminance. The number of the subsidiary light emitting device strings is smaller than that of the principal light emitting device strings. When the principal light emitting device strings and the subsidiary light emitting device strings are arrayed in a one-dimensional matrix pattern, in a vertical direction of the color liquid crystal display panel, with the horizontal direction of the color liquid crystal display panel as the longitudinal direction, the subsidiary light emitting device strings are arrayed towards the rim of the color liquid crystal display panel.

According to the present invention, there is also provided a backlight device for illuminating a transmissive color liquid crystal display panel with white light from its backside surface. The backlight device includes, as a light source, a plurality of principal light emitting device strings, each of which is a string of a plurality of light emitting devices emitting white light of preset luminance, and a plurality of subsidiary light emitting device strings, each of which is a string of a plurality of light emitting devices emitting white light of luminance lower than the preset luminance. The number of the subsidiary light emitting device strings is smaller than that of the principal light emitting device strings. When the principal light emitting device strings and the subsidiary light emitting device strings are arrayed in a two-dimensional matrix pattern, with the horizontal direction of the color liquid crystal display panel as the longitudinal direction, the subsidiary light emitting device strings are arrayed towards the rim of the color liquid crystal display panel.

According to the present invention, in which light emitting diode units are arrayed to satisfy a chromaticity-based arraying policy and a luminance-based arraying policy, light emitting diode units, manufactured but not used, may be used to advantage without generating variations in luminance or chromaticity. It is therefore possible to reduce production costs of a backlight device color for illuminating a liquid crystal display panel and hence a color liquid crystal display apparatus including a color liquid crystal display panel and a backlight device.

Other objects and advantages derived from the present invention will become more apparent from the following description which will now be made in conjunction with the accompanying drawings.

BEST MODE FOR CARRYING OUT THE INVENTION

Figure 1:
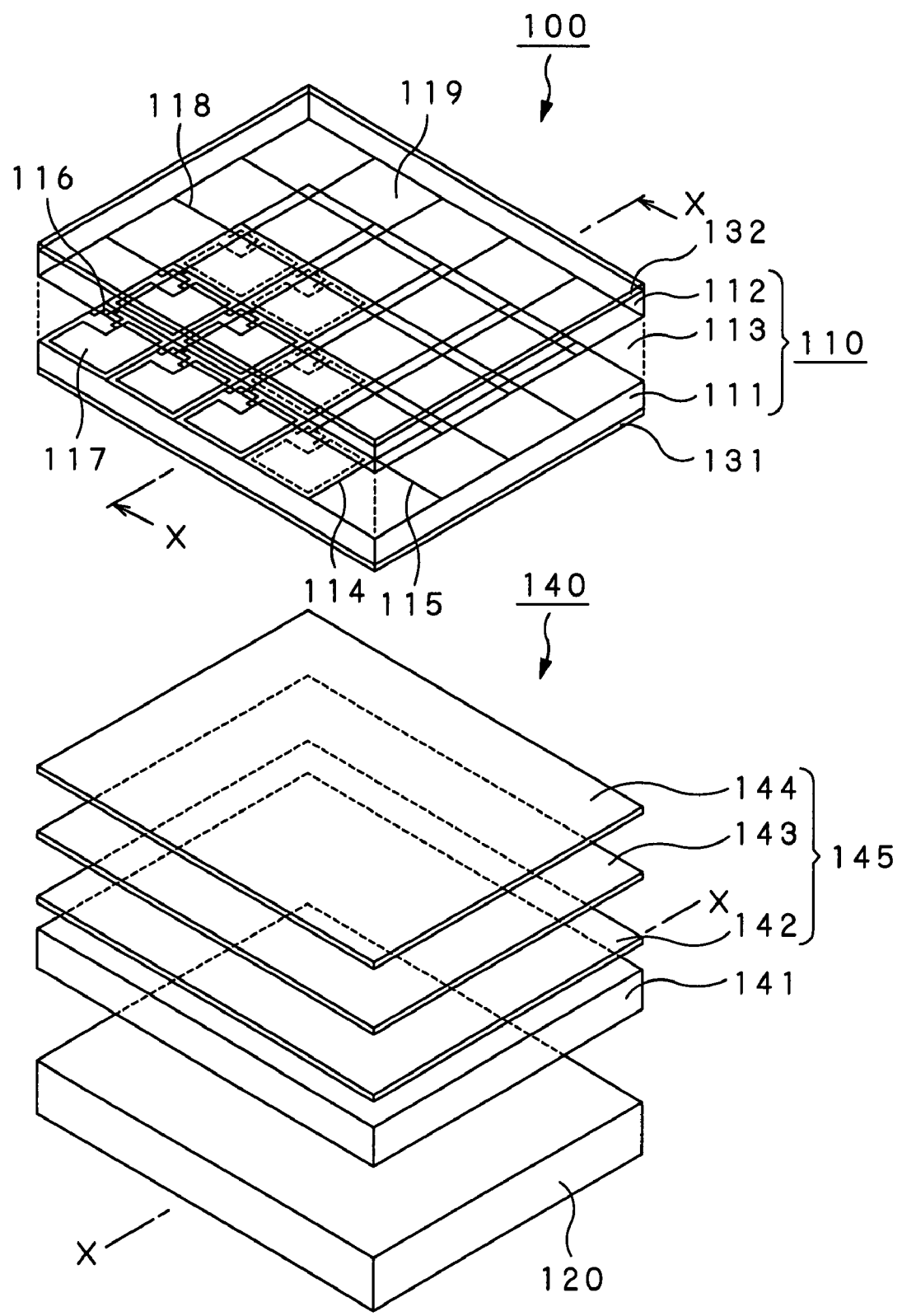
FIG. 1 is an exploded perspective view showing an embodiment of a transmissive color liquid crystal display apparatus embodying the present invention.

Referring to the drawings, preferred embodiments of the present invention will be described in detail. It should be noted that the present invention is not to be limited to the embodiments now described and may be optionally modified without departing from the scope of the invention.

The present invention is applied to, for example, a color liquid crystal display apparatus 100 arranged as shown in FIG. 1.

In this figure, the transmissive color liquid crystal display apparatus 100 is made up of a transmissive color liquid crystal display panel 110, and a backlight unit 140, provided on the backside of this color liquid crystal display panel 110. This transmissive color liquid crystal display apparatus 100 may be provided with a receiving unit, such as an analog tuner or a digital tuner, for receiving the ground wave or the satellite wave, a picture signal processing unit or an audio signal processing unit for processing picture signals or audio signals, received by this receiving unit, respectively, and an audio signal outputting unit, such as loudspeaker, for outputting audio signals processed by the audio signal processing unit, although these units are not shown.

The transmissive color liquid crystal display panel 110 is made up of two transparent substrates, formed by glass or the like (a TFT substrate 111 and a counter-electrode substrate 112), and a liquid crystal layer 113 of, for example, twisted nematic (TN) liquid crystal, enclosed in a space between the two substrates. On the TFT substrate 111, there are formed signal lines 114 and scanning lines 115, arranged in a matrix configuration, as well as thin-film transistors 116, as switching elements, and pixel electrodes 117, arranged at the points of intersection of the signal lines 114 and the scanning lines 115. The thin-film transistors 116 are sequentially selected by the scanning lines 115 to write picture signals, supplied from the signal lines 114, in associate ones of the pixel electrodes 117. On the inner surfaces of the counter-electrode substrate 112, there are formed counter electrodes 118 and a color filter 119.

Figure 2:
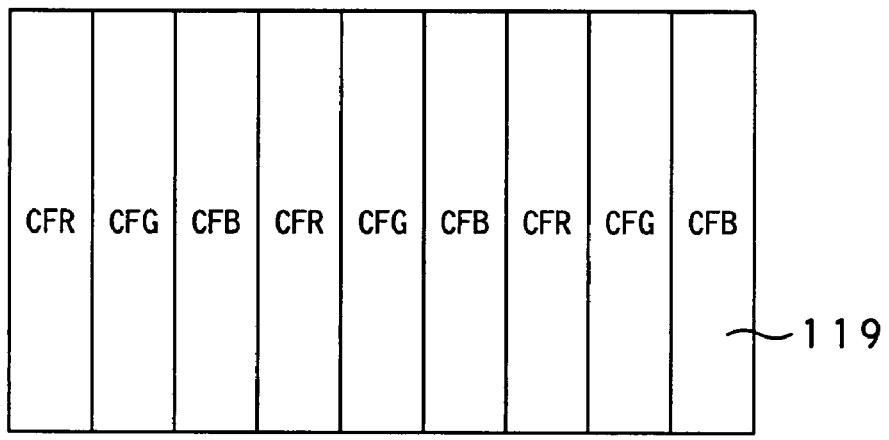
FIG. 2 is a plan view showing an example of a color filter provided on a color liquid crystal display panel of the transmissive color liquid crystal display apparatus.

The color filter 119 is divided into a plural number of filter segments each associated with a pixel. For example, the color filter 119 is divided into three filter segments, associated with three prime colors, that is, a red filter CFR, a green filter CFG and a blue filter CFB. The arraying pattern for the color filter may be exemplified by a delta array or a square array, not shown, in addition to a striped array shown in FIG. 2.

Referring again to FIG. 1, the constitution of the transmissive color liquid crystal display apparatus 100 is now described. With this transmissive color liquid crystal display apparatus 100, the transmissive color liquid crystal display panel 110 is sandwiched between a pair of polarizing plates 131, 132 and driven in accordance with an active matrix system, as white light is illuminated from the backside of the panel by the backlight unit 140, such as to display a full color picture.

The backlight unit 140 illuminates the color liquid crystal display panel 110 from its backside surface. Referring to FIG. 1, the backlight device for color liquid crystal display 140 includes a backlight enclosure 120, and a set of optical sheets 145, in the backlight enclosure 120, such as a light diffusing sheet 141, a prism sheet 142, a prism sheet 143 and a polarized light transforming sheet 144. The sheets 142 to 144 are stacked on the light diffusing sheet 141. The backlight device 20 includes a light source, not shown here, and has the function of mixing the light from the light source to generate white light. The light diffusing sheet 141 causes the light radiated from the light source to be internally diffused to provide for uniform luminance in in-surface light radiation.

The set of optical sheets is made up in general of a plural number of sheets having the functions of resolving the incident light into mutually perpendicular polarized components, compensating for the phase difference of light waves to assure a broad angle of visibility as well as to prevent coloration, diffusing the incident light and improving the luminance. The set of optical sheets is provided for transforming the light, radiated by surface light emission from the backlight device 140, into the illuminating light having optimum optical characteristics for illustrating the color liquid crystal panel 110. Consequently, the set of optical sheets may include not only the light diffusing plate 142, prism sheet 143 or polarized light transforming plate 144, but a variety of other optical sheets having other optical functions.

Figure 3:
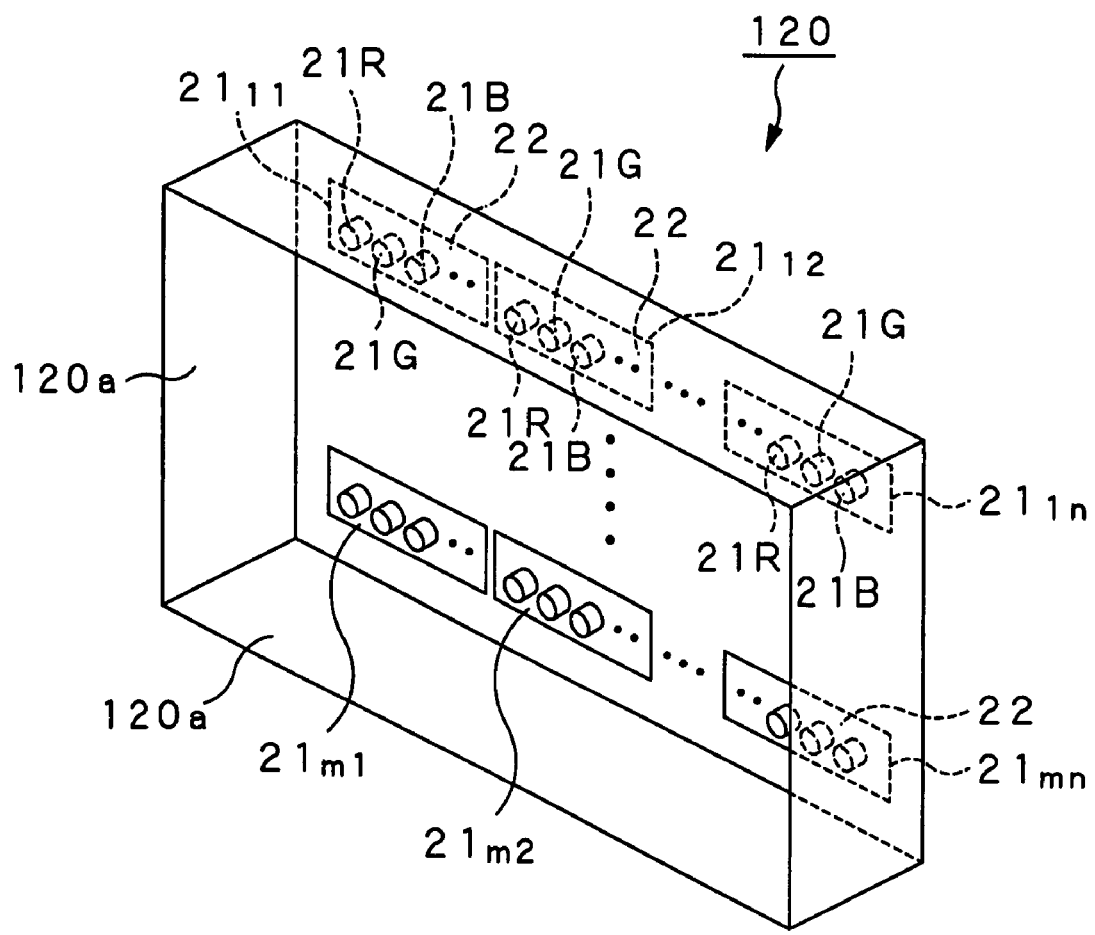
FIG. 3 is a perspective view showing a backlight device provided on the transmissive color liquid crystal display apparatus.

FIG. 3 shows the configuration of the backlight enclosure 120 in a schematic perspective view. Referring to FIG. 3, the backlight enclosure 120 uses, as light source, a red light emitting diode 21R, radiating red light, a green light emitting diode 21G, radiating green light and a blue light emitting diode 21B, radiating blue light. In the following description, in case the red light emitting diode 21R, green light emitting diode 21G and the blue light emitting diode 21B are referred to generically, each light emitting diode is simply referred to as a light emitting diode 21.

Referring to FIG. 3, the light emitting diodes 21 are horizontally arranged in a unit of light emitting diodes $21_{mn}$, where m and n are natural numbers. This light emitting diode unit $21_{mn}$ becomes a minimum unit in arraying the light emitting diodes 21 as light source in the backlight device 140. Meanwhile, in the following description, the light emitting diode unit $21_{mn}$ are also termed a light source.

There are a variety of methods or sequences of arraying light emitting diodes 21 on the substrate 22 to create the light emitting diode unit $21_{mn}$. For example, there is the most basic arraying sequence in which a red light emitting diode 21R, a green light emitting diode 21G and a blue light emitting diode 21B constitute a unit of repetition, as shown in FIG. 3. There is also an arraying sequence, not shown, in which green light emitting diodes 21G are arrayed at equal intervals and in which red light emitting diodes 21R and blue light emitting diodes 21B are alternately arranged in-between the neighboring green light emitting diodes 21G. The light emitting diodes 21 of the light emitting diode unit $21_{mn}$ are selected so that the light emitting diode unit $21_{mn}$ will radiate white light of chromaticity and luminance within a preset range, as will be described subsequently.

A number of the light emitting diode units $21_{mn}$, which is in keeping with the size of the color liquid crystal display panel 110 to be illuminated by the backlight unit 140, are arranged in a two-dimensional matrix pattern within the backlight enclosure 120. The light emitting diode unit $21_{mn}$ may be arranged in the backlight enclosure 120 so that the longitudinal direction of the light emitting diode units $21_{mn}$ will be the horizontal direction, as shown in FIG. 3, or the vertical direction, in a manner not shown. Alternatively, the light emitting diode unit $21_{mn}$ may be arranged in the backlight enclosure so that the longitudinal direction of the light emitting diode units $21_{mn}$ will be partially the horizontal direction and partially the vertical direction.

The technique of arraying the light emitting diode units $21_{mn}$ in the horizontal or vertical direction is the same as that of arraying the CCFLs so far used as light source of the backlight unit, and hence the designing know-how accumulated up to now may be exploited to reduce the cost or time until manufacture.

An inner wall surface 120a of the backlight enclosure 120 is a reflective surface obtained on reflective processing for raising the utilization efficiency of light emitted by the light emitting diodes 21. Within the backlight unit 140, there is provided a diverter plate, not shown, for mixing color light beams, radiated from the light emitting diodes 21, as light source, into white light suffering variations of chromaticity only to a lesser extent. The light mixed in color by this diverter plate is radiated via the light diffusing sheet 141 and the set of optical sheets 145 as white light from the backlight unit 140 to illuminate the color liquid crystal display panel 110 from its backside surface.

Figure 4:
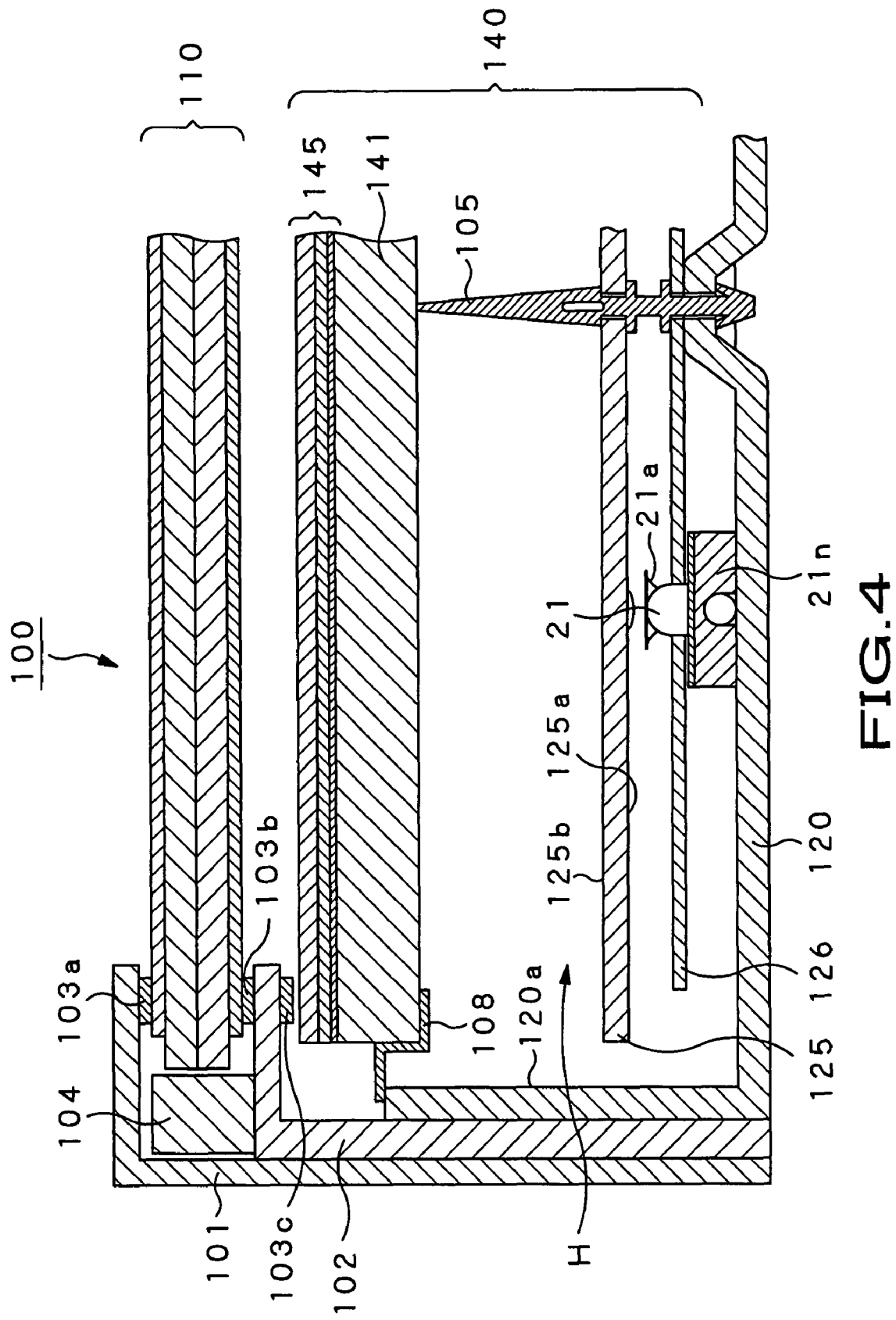
FIG. 4 is a cross-sectional view taken along line X-X of FIG. 1.

FIG. 4 depicts a fragmentary cross-sectional view, taken along line X-X of FIG. 1, and showing the completed transmissive color liquid crystal display apparatus 100 shown in an unassembled state in FIG. 1. Referring to FIG. 4, the color liquid crystal display panel 110, forming a part of the color liquid crystal display apparatus 100, is retained via spacers 103a, 103b, by an outer frame 101, as an outer enclosure for the color liquid crystal display apparatus 100, and an inner frame 102. A guide member 104 is provided between the outer frame 101 and the inner frame 102 to prohibit the color liquid crystal display panel 110, sandwiched between the outer frame 101 and the inner frame 102, from shifting in the longitudinal direction.

The backlight unit 140, forming the transmissive color liquid crystal display apparatus 100, includes a light guide plate 141, carrying thereon the set of optical sheets 145, as described above, and a light diffusion guide plate (diverter plate) 125. The light diffusion guide plate 125 is arranged overlying the light emitting diode units $21_{mn}$ as light source for mixing the red (R) light, green (G) light and blue (B) light, radiated from the respective light emitting diodes 21. A light reflective sheet 126 is arranged between the light diffusion guide plate 125 and the backlight enclosure 120.

Since the light emitting diodes 21, emitting three prime colors of R, G and B, are used as light source, the light diffusion guide plate 125 has the color mixing function, and diffuses the light radiated from the light emitting diodes 21 and reflected back from the light reflective sheet 126.

The light reflective sheet 126 is mounted so that a reflective surface thereof faces a light incident surface 125a of the light diffusion guide plate 125 and so that the reflective surface is closer to the backlight enclosure 120 than the direction of light emission from the light emitting diode 21. The light reflective sheet 126 is e.g. a sensitized silver reflective film created by layering a silver reflective film, a low refractive index film and a high refractive index film in this order on a sheet substrate. This light reflective sheet 126 mainly reflects light emitted from the light emitting diode 21 and incident on the light reflective sheet after reflection from the light diffusion guide plate 125 and light reflected from the inner wall surface 120a of the backlight enclosure 120 obtained on reflectivity processing.

The light diffusing sheet 141, light diffusion guide plate 125 and the light reflective sheet 126 of the backlight unit 140 are arranged facing each other, and are retained within the backlight enclosure 120 of the backlight unit 140, as they are spaced apart one from another at preset distances by plural optical studs 105 provided within the backlight enclosure 120. The light diffusing sheet 141 is also retained by a bracket member 108 provided within the backlight enclosure 120.

Still referring to FIG. 4, each light emitting diode 21 has a light emitting bulb retained by a resin holder, and has a pair of terminals protruded from the resin holder, in a manner not shown nor described in detail. Each light emitting diode 21 is a so-called side emission LED provided with an optical component 21a radiating light from the light source sideways. That is, the light emitting diode 21 has light directivity such that main portions of outgoing light are radiated sideways from the outer periphery of the light emitting bulb.

The side emission light emitting diode has been disclosed in e.g. the JP Laid-Open Patent Publications 2003-8068 and 2004-133391.

Figure 5:
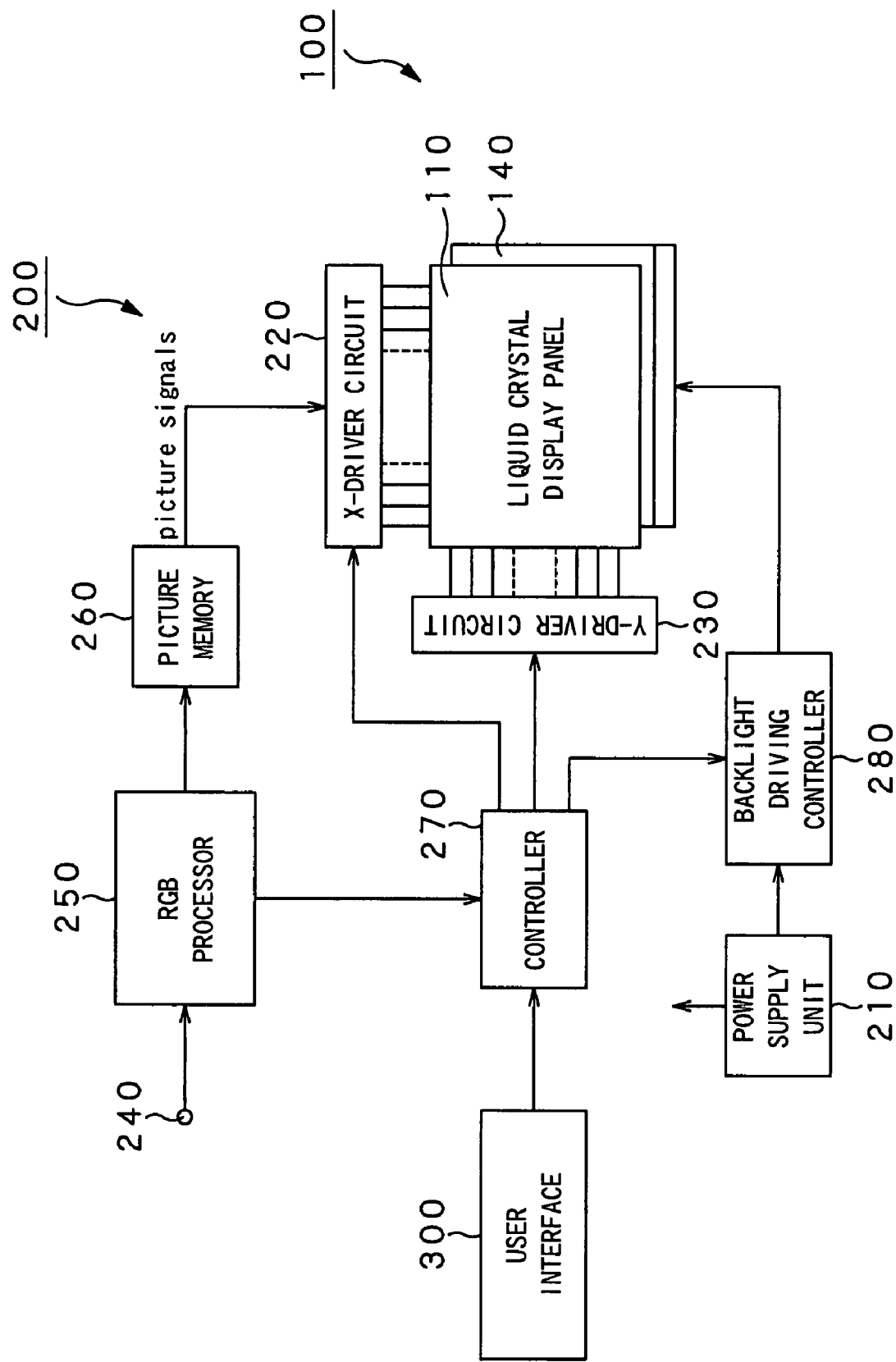
FIG. 5 is a block circuit diagram showing a driving circuit for driving the color liquid crystal display apparatus.

The transmissive color liquid crystal display apparatus 100, constructed as described above, is driven by a driving circuit 200, shown in FIG. 5, as an example. The driving circuit 200 includes a power supply unit 210, supplying the driving supply power to the color liquid crystal display panel 110 or to the backlight unit 140. The driving circuit 200 also includes an X-driver circuit 220 and a Y-driver circuit 230 for driving the color liquid crystal display panel 110. The driving circuit 200 also includes an RGB processor 250, supplied via input terminal 240 with picture signals supplied from outside or with picture signals received by a receiver, not shown, provided on the transmissive color liquid crystal display apparatus 100, and processed by the picture signal processor. The driving circuit 200 also includes a picture memory 260 and a controller 270, both connected to the RGB processor 250. The driving circuit 200 further includes a backlight driving controller 280 for exercising driving control of the backlight unit 140.

In this driving circuit 200, the picture signals, received via input terminal 240, are processed with e.g. chroma processing, by the RGB processor 250, while being converted from composite signals into RGB separate signals suited for driving the color liquid crystal display panel 110. The so generated RGB separate signals are supplied to the controller 270 and via picture memory 260 to the X-driver 220.

The controller 270 controls the X-driver circuit 220 and the Y-driver circuit 230, at a preset timing related with the RGB separate signals, and actuates the color liquid crystal display panel 110 by the RGB separate signals, supplied via picture memory 260 to the X-driver circuit 220, such as to display a picture corresponding to the RGB separate signals.

The backlight driving controller 280 generates a pulse width modulated (PWM) signals, from the voltage supplied from a power supply 210, to actuate each light emitting diode 21 operating as light source for the backlight unit 140. In general, the color temperature of the light emitting diode depends on the operating current. Hence, if it is desired to reproduce the color faithfully, that is, to provide for a constant color temperature, as predetermined luminance is maintained, it is necessary to drive the light emitting diode 21 with a pulse width modulated signal to suppress changes in color.

A user interface 300 is used for selecting a channel for reception by the receiver, described above but not shown, adjusting the voice output volume from a voice outputting unit, not shown, adjusting the luminance of white light from the backlight unit 140, adapted for illuminating the color liquid crystal display panel 110, and for adjusting the white balance.

For example, if a user adjusts the luminance from the user interface 300, a luminance control signal is transmitted to the backlight driving controller 280 through the controller 270 of the driving circuit 200. Responsive to this driving control signal, the backlight driving controller 280 changes the duty ratio of the pulse width modulated signal for each of the red light emitting diode 21R, green light emitting diode 21G and the blue light emitting diode 21B to effect driving control of the red light emitting diode 21R, green light emitting diode 21G and the blue light emitting diode 21B.

The manner of selecting the light emitting diode unit $21_{mn}$, used as a light source for the backlight unit 140 of the color liquid crystal display apparatus 100, will now be described.

In general, the light emitting diode is a light emitting device exhibiting significant variations in both luminance and chromaticity. The light emitting diodes 21, used as light source for the backlight unit 140, are also unexceptionally high in variations in luminosity and chromaticity from one color to another.

It is therefore necessary to suitably select the light emitting diodes 21, used as light source, so that the white light radiated from the backlight unit 140 for illuminating the color liquid crystal display panel 110 will be of desired chromaticity and luminance. However, if the sole concern is the white light of desired chromaticity and luminance, the result is partialized selection of the light emitting diodes 21 from among the light emitting diodes 21 manufactured and available for use. In this case, the number of the light emitting diodes 21 manufactured for use but not used, that is, unused products, is increased, thus wastefully raising the manufacture cost.

It is therefore desirable to impartially use the light emitting diodes 21, variable in chromaticity and luminance, as the light source for the backlight unit 140, and to suitably select the combination of the light emitting diodes to be in use so that chromaticity and luminance of the white light generated will be of desired values.

If the color liquid crystal display panel 110 is increased in size, the number of the light emitting diodes 21 is also significantly increased. It is therefore extremely difficult to verify the values of the chromaticity and luminance of the light emitting diodes 21 one by one to arrive at the combination of the light emitting diodes which will give the white light of the targeted chromaticity and luminance. It may be contemplated to verify the chromaticity and luminance of the light emitting diodes 21 in terms of the light emitting diode unit $21_{mn}$ as a unit to select the optimum combination of the light emitting diodes which will give the white light of the targeted chromaticity and luminance, in such a manner as to enable facilitated selection of the light emitting diodes 21 used as light source. That is, the light source of the backlight unit 140 is thought of not as being constituted as an assembly of individual light emitting diodes but rather as being constituted as an assembly of the light emitting diode units $21_{mn}$ each of which is a set of light emitting devices which are light emitting diodes 21.

The light emitting diode units $21_{mn}$ are arrayed, as light source for the backlight unit 140, within the backlight enclosure 120, so that both the chromaticity-based arraying policy and the luminance-based arraying policy will be met, in such a manner that white light free from variations in chromaticity or in luminance will be generated within the backlight enclosure 120.

The chromaticity-based arraying policy and the luminance-based arraying policy will now be described. To avoid complexity in description, the chromaticity-based arraying policy and the luminance-based arraying policy will be described separately. However, in actuality, the light emitting diode units $21_{mn}$ are arrayed in the backlight enclosure 120 for satisfying both of these policies.

{Chromaticity-Based Arraying Policy}
<The Case of Arraying the Light Emitting Diode Units in a One-Dimensional Matrix>

Figure 6:
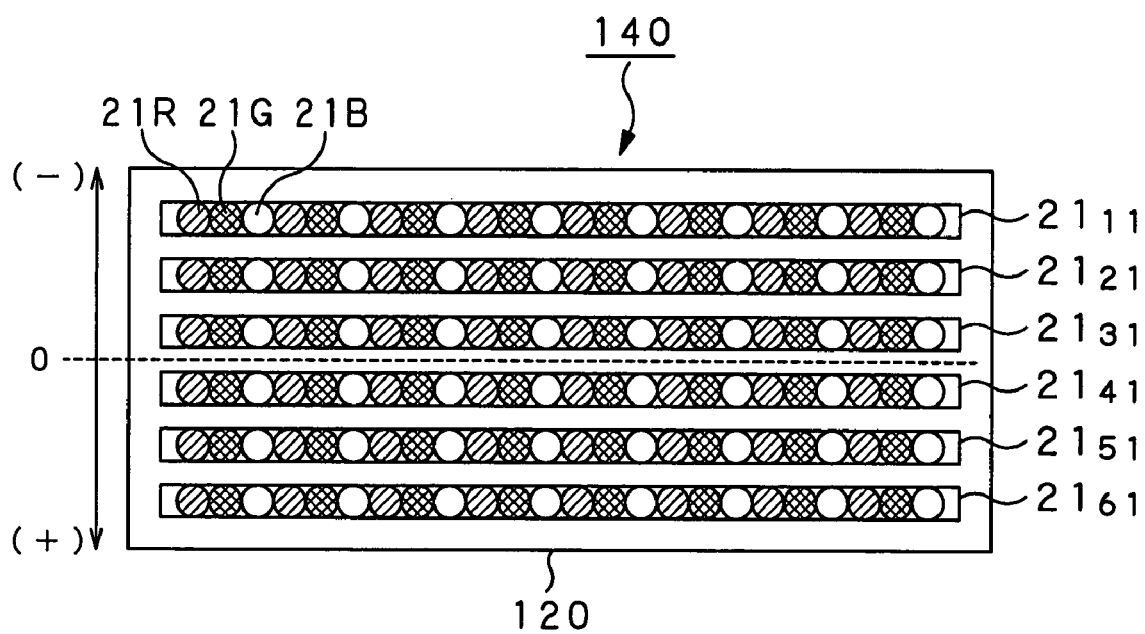
FIG. 6 is a plan view showing a backlight device made up of a plural number of light emitting diode units arrayed in a one-dimensional matrix pattern.

In scrutinizing the chromaticity-based arraying policy, the case in which m and n of the light emitting diode unit $21_{mn}$ are such that m=6 and n=1 is initially scrutinized. It is supposed that only six rows of the light emitting diode units $21_{mn}$ are arrayed, with the horizontal direction of the color liquid crystal display panel 110 as the longitudinal direction, as shown in FIG. 6.

It is noted that the light emitting diode units $21_{mn}$ arrayed in the backlight enclosure 120 of the backlight unit 140 are selected, out of the light emitting diode units $21_{mn}$, each made up of a number of light emitting diodes 21, exhibiting variable values of chromaticity, in such a manner that the white light of the targeted chromaticity will be radiated by the backlight units 140.

If it is attempted to create the light emitting diode unit $21_{mn}$ through effective utilization of the light emitting diodes 21, exhibiting variable values of chromaticity, it is extremely difficult with the so created light emitting diode units $21_{mn}$ to generate white light of a chromaticity wholly coincident with the targeted chromaticity.

That is, the light emitting diode unit $21_{mn}$ is made up of one or more red light emitting diodes 21R, one or more green light emitting diodes 21G and one or more blue light emitting diodes, 21B, with the red light emitting diodes 21R emitting red light beams differing in chromaticity, with the green light emitting diodes 21G emitting green light beams differing in chromaticity and with the blue light emitting diodes 21B emitting blue light beams differing in chromaticity. Hence, there may be light emitting diode units radiating white light of poor color purity, such as yellowish white light or bluish white light.

It is therefore necessary to assess the chromaticity of the white light generated by the light emitting diode units $21_{mn}$ created, and to properly array the light emitting diode units $21_{mn}$ in the backlight enclosure 120, depending on the so assessed chromaticity, otherwise the variations in chromaticity are produced.

Figure 7:
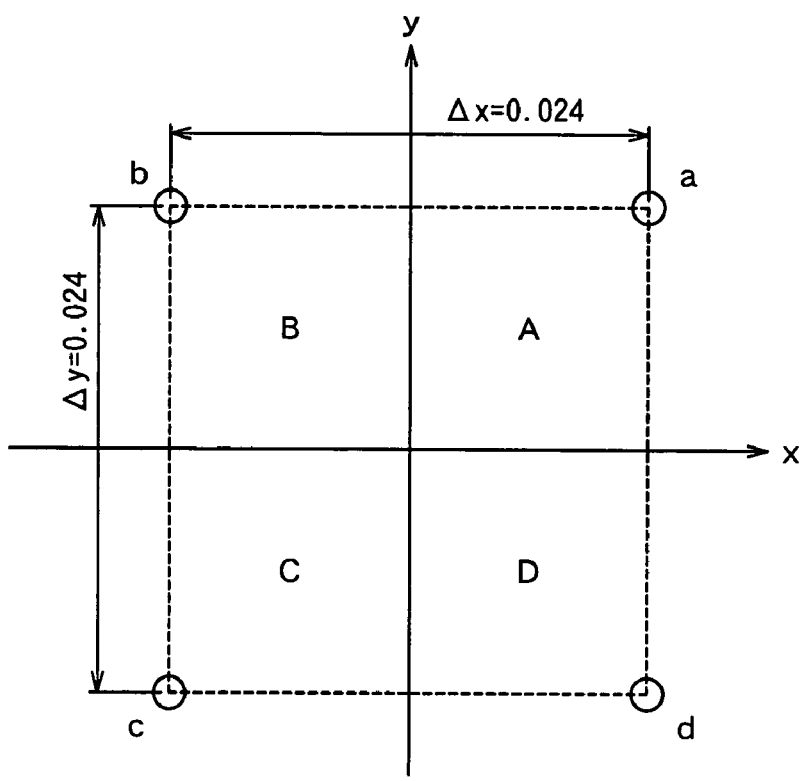
FIG. 7 is an xy chromaticity diagram indicating grades used for classifying the light emitting diodes based on chromaticity.

Hence, the light emitting diode units $21_{mn}$, created using the light emitting diodes 21, exhibiting variations in chromaticity, are classified based on the chromaticity of the white light, into any of four grades A, B, C and D of the range of chromaticity, as provided in the xy chromaticity diagram of the XYZ color system, as shown in FIG. 7. This xy chromaticity diagram was prescribed in 1931 by Commission Internationale de l'Eclairage. In actuality, the grades into which the light emitting diode units $21_{mn}$ are classified are provided in a range broader than one shown in FIG. 7, depending on the degree of variations of the chromaticity of the white light generated by the light emitting diode units $21_{mn}$. At any rate, the distribution of the light emitting diode units $21_{mn}$ is such that the light emitting diode units are predominantly in the vicinity of the chromaticity point of the white light targeted with the backlight unit 140.

Figure 8:
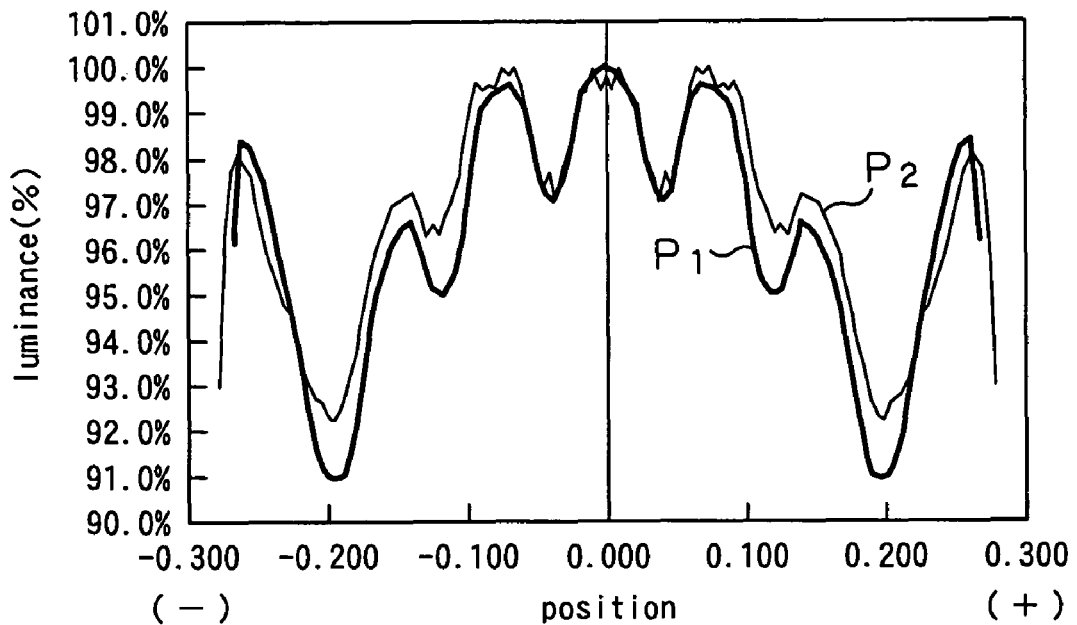
FIG. 8 is a graph showing luminance at each vertical position of the backlight device.

The effect of the arraying positions of the light emitting diode units $21_{mn}$ arranged in the backlight enclosure 120 of the backlight unit 140 is now verified. FIG. 8 shows the result of comparison of the luminance obtained when the light emitting diode units $21_{mn}$ are arranged within the backlight enclosure 120 and all of the light emitting diode units $21_{mn}$ are lit and the luminance obtained when the light emitting diode units $21_{mn}$ arranged in this manner are lit row by row.

The abscissa of FIG. 8 coincides with the vertical direction of the backlight unit 140 shown in FIG. 6. The minus direction of the abscissa of FIG. 8 coincides with the upper half of the vertical direction of FIG. 8 with a mid position between the light emitting diode units $21_{mn}$ and the light emitting diode units $21_{mn}$ as center. On the other hand, the plus direction of the abscissa of FIG. 8 coincides with the lower half of the vertical direction of FIG. 8 with the same mid position as center. In FIG. 8, the data obtained on lighting the light emitting diode units $21_{mn}$ row by row are also shown.

It is seen from FIG. 8 that the luminance $P_1$ in case all of the light emitting diode units $21_{mn}$ are lit differs by only approximately one percent from the luminance $P_2$ in case the light emitting diode units $21_{mn}$ are lit individually. It may therefore be considered that white light radiated by the backlight unit 140 is not generated by the light emitted by specified light emitting diode units $21_{mn}$ arrayed in a specified location. On the contrary, the light radiated from the light emitting diode units $21_{mn}$ arrayed at all positions in the backlight enclosure 120 ubiquitously contribute to generation of the white light radiated from the backlight unit 140 without regard to the particular positions of the light emitting diode units $21_{mn}$ in the backlight enclosure 120.

Figure 9:
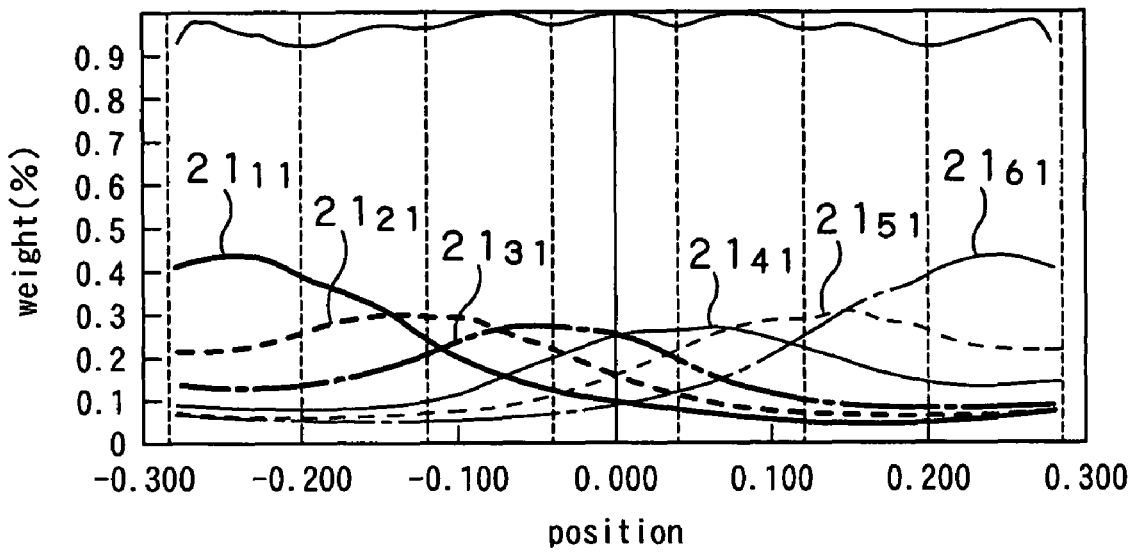
FIG. 9 is a graph showing the degree of contribution to the light radiated by the backlight device of the difference in the arraying positions of the light emitting diode units.

FIG. 9 shows how much the light radiated from the light emitting diode units $21_{mn}$ shown in FIG. 6 contributes to the white light radiated from the backlight unit 140, as weight in contribution. It is seen from FIG. 9 that the volume of light radiated from the light emitting diode units $21_{mn}$ does not exceed 50%. In short, it may be considered that illuminance of light radiated from the light emitting diode units $21_{mn}$ is distributed over a broader range within the backlight enclosure 120.

It is seen from this that, when the above results are adapted to chromaticity, light mixing may be achieved in a direction of diminishing the variations in chromaticity if the light emitting diode units $21_{mn}$, used as light source for the backlight unit 140, are arrayed in the backlight enclosure 120, even in case there is difference in chromaticity among the individual light emitting diode units $21_{mn}$ so strong as to produce apparent variations in chromaticity. That is, since it is possible to diminish the variations in chromaticity even if the light emitting diode units $21_{mn}$ different in chromaticity difference one from another are positively arrayed in the same backlight enclosure 120, the light emitting diode units $21_{mn}$ of different grades, as described above with reference to FIG. 7, may be arrayed in one and the same backlight enclosure 120.

In light of the above-described properties of the backlight unit 140, the light emitting diode units $21_{mn}$ are properly selected out of the light emitting diode units $21_{mn}$ graded in the chromaticity diagram shown in FIG. 7 and are arrayed in a manner which will further diminish the variations in chromaticity.

It is noted that the light emitting diode units $21_{mn}$ used as light source for the same backlight unit 140 are restricted to those classified in two grades. The reason for doing this is to eliminate the complexity in the operational process in mass-producing the backlight units 140.

In selecting the light emitting diode units $21_{mn}$, the combinations of the grades of closer values of chromaticity are preferred. That is, given the grades shown in FIG. 7, the light emitting diode units $21_{mn}$ are desirably selected out of the combinations of (grade A and grade B), (grade A and grade D), (grade B and grade C) and (grade C and grade D). Although the combinations of (grade A and grade C), (grade B and grade D) may be thought of, it becomes more difficult with these combinations to diminish the variations in chromaticity than with the above four combinations.

If once the grade combinations in selecting the light emitting diode units $21_{mn}$ are determined, the arraying positions in the backlight enclosure 120 are then determined. The light emitting diode units $21_{mn}$ contribute differently to the white color radiated by the backlight unit 140, depending on the arraying positions thereof, as described above. Thus, in arraying the light emitting diode units $21_{mn}$ different in chromaticity, such arraying positions exhibiting the least effect of the difference in chromaticity may be found by taking into account the weight which may be variable depending on the arraying positions.

The light emitting diode unit $21_{mn}$ is set by arraying a plural number of the light emitting diodes 21, variable in chromaticity, so that the light emitting diode unit $21_{mn}$ so set will generate white light of targeted chromaticity. The result is that the number of the light emitting diode units $21_{mn}$ of the grade of chromaticity close to the targeted chromaticity is dominant, such that, if a given value of chromaticity is remoter from the targeted chromaticity, the smaller is the number of the light emitting diode units $21_{mn}$ having such chromaticity value.

Thus, in selecting the light emitting diode units $21_{mn}$ of the two sorts of the grades, the light emitting diode units $21_{mn}$ of the grade, the number of which has become dominant at grading the light emitting diode units depending on chromaticity, are taken to be principal light emitting diode units $21_{mn}$ to be distributed all over the backlight enclosure 120. On the other hand, the light emitting diode units $21_{mn}$ of the grade, the number of which is minor, are arrayed as subsidiary light emitting diode units $21_{mn}$.

The effect of the arraying positions of the light emitting diode units $21_{mn}$ on the difference in chromaticity is now verified using the two sorts of grades of real light emitting diode units $21_{mn}$. To clarify the effect on the difference in chromaticity, the light emitting diode units $21_{mn}$ of the grades A and C, representing the worst case of the maximum difference in chromaticity, shown in FIG. 7, are now used. Specifically, the light emitting diode units $21_{mn}$ of the grade A, emitting the white light with the chromaticity point a, are taken to be the principal light emitting diode units $21_{mn}$, while the light emitting diode units $21_{mn}$ of the grade C, emitting the white light with the chromaticity point c, are taken to be the subsidiary light emitting diode units $21_{mn}$.

(1) Case where Only One Row of the Subsidiary Light Emitting Diode Units $21_{mn}$ is Used Initially, such a case in which five rows of light emitting diode units $21_{mn}$ belonging to the grade A and emitting white light with the chromaticity point a, and only one row of light emitting diode units $21_{mn}$ belonging to the grade C and emitting white light with the chromaticity point c, are used in the backlight unit 140 shown in FIG. 6, is now scrutinized.

Figure 10:
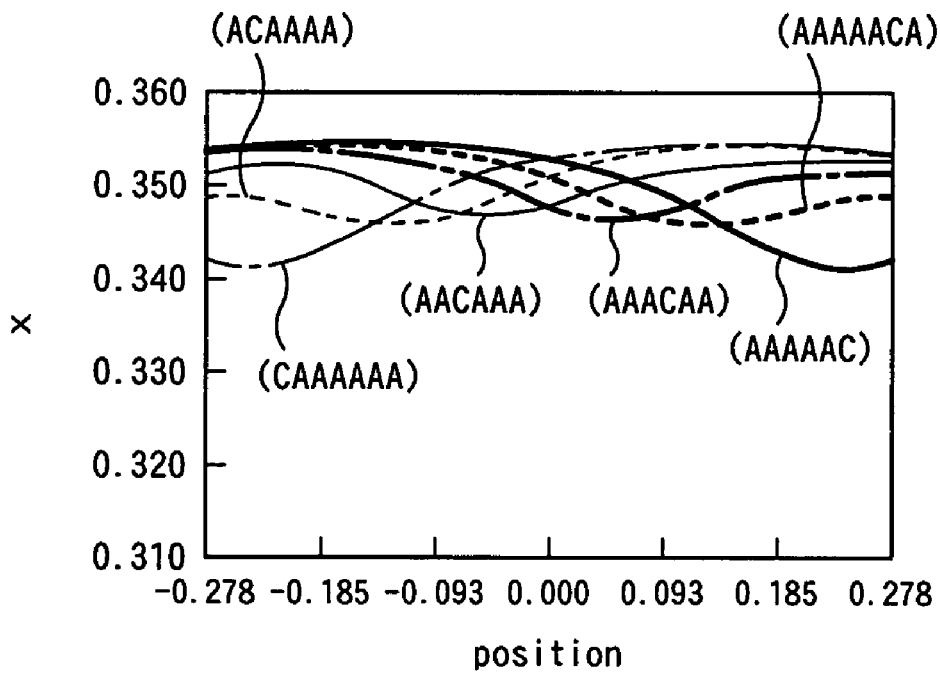
FIG. 10 is a graph showing chromaticity in the vertical direction of white light radiated from the backlight device (only x-coordinates), against various arraying positions, in case of arraying only one row of subsidiary light emitting diode units.
Figure 11:
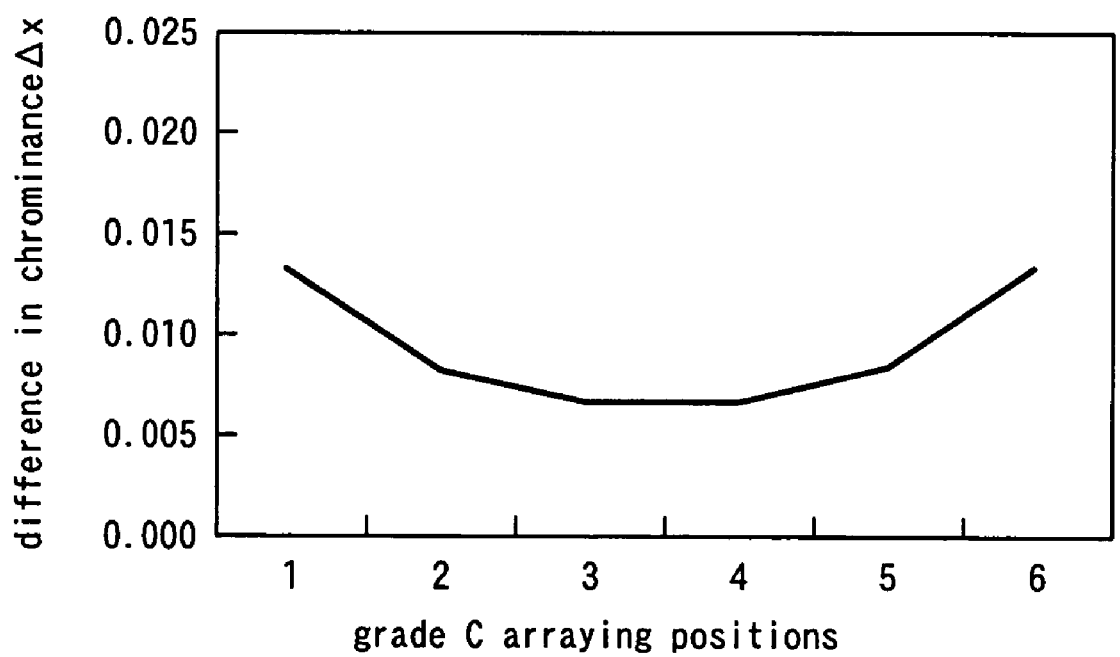
FIG. 11 is a graph showing in-surface chromaticity difference of white light radiated from the backlight device (only x-coordinates), against various arraying positions, in case of arraying only one row of subsidiary light emitting diode units.

FIG. 10 shows the results of calculations of x-coordinates of chromaticity points at respective positions along the vertical direction of the backlight unit 140, when the arraying positions of the light emitting diode units $21_{mn}$ belonging to the grade C are changed, as the aforementioned weight from one arraying position to another is taken into account. FIG. 11 shows the results of calculations of chromaticity difference Δx from one arraying position of the light emitting diode unit $21_{mn}$ belonging to the grade C to another. The chromaticity difference Δx is the difference between the minimum chromaticity and the maximum chromaticity of the x-coordinates within the radiating surface of the white light radiated from the backlight unit 140.

As may be seen from the results shown in FIGS. 10 and 11, if, in arraying the light emitting diode units $21_{mn}$ with different values of chromaticity, the light emitting diode units are arrayed at an upper extreme end or a lower extreme end of the backlight enclosure 120, as rim sides of the color liquid crystal display panel 110, that is, the light emitting diode units are arrayed as the light emitting diode units $21_{mn}$ or as the light emitting diode units $21_{mn}$, the difference in chromaticity within the radiating surface of the white light may become maximum, such that variations in chromaticity tend to be manifested strongly. If conversely the light emitting diode units are arrayed at a mid part of the backlight enclosure 120 in the vicinity of the center of the color liquid crystal display panel 110, that is, as the light emitting diode units $21_{31}$ or as the light emitting diode units $21_{41}$, the difference in chromaticity on the radiating surface of the white light may be minimized to suppress chromaticity variations significantly.

(2) Case where Plural Rows of the Light Emitting Diode Units $21_{mn}$ of the Grade C are Used Such a case in which, in the backlight unit 140, shown in FIG. 6, made up of light emitting diode units $21_{mn}$ belonging to the grade A and radiating white light having the chromaticity point a, these light emitting diode units $21_{mn}$ are replaced sequentially, beginning from the upper end, by increasing numbers of light emitting diode units $21_{mn}$ belonging to the grade C and radiating white light having the chromaticity point c.

Figure 12:
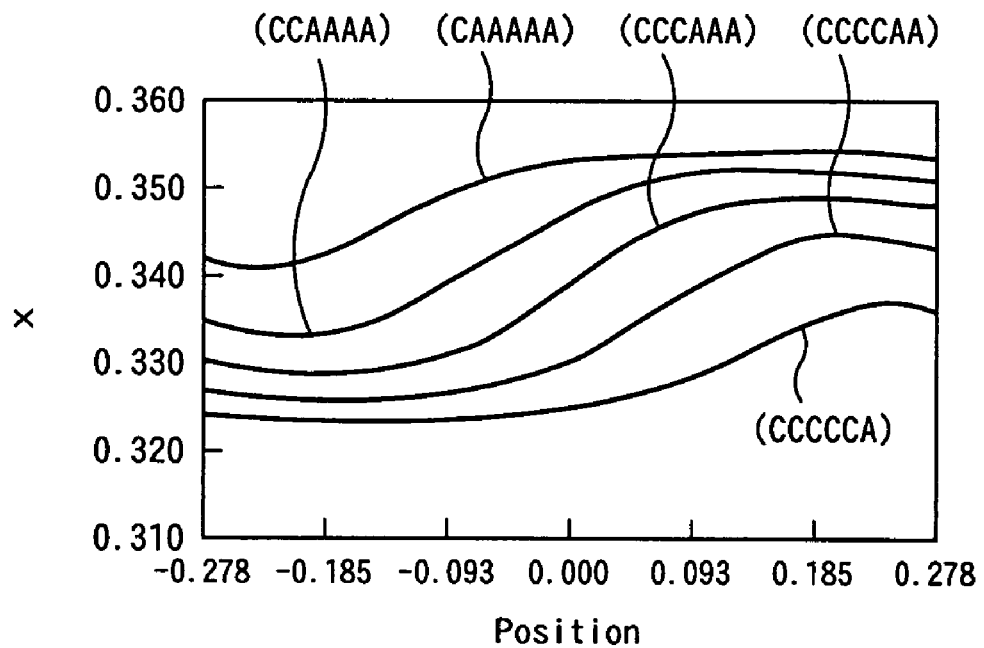
FIG. 12 is a graph showing chromaticity in the vertical direction of white light radiated from the backlight device (only x-coordinates), for each of a plural number of rows of subsidiary light emitting diode units arrayed.
Figure 13:
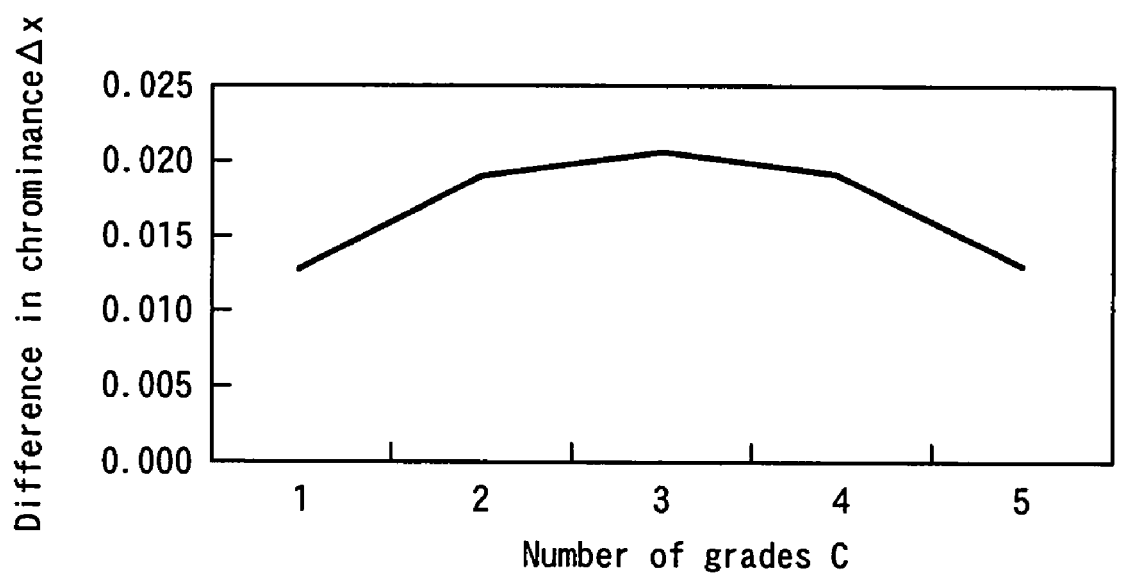
FIG. 13 is a graph showing the in-surface chromaticity difference of white light radiated from the backlight device (only x-coordinates), for each of a plural number of rows of subsidiary light emitting diode units arrayed.

FIG. 12 shows results of calculations of x-coordinates of chromaticity points at respective positions along the vertical direction of the backlight unit 140, when the arraying positions of the light emitting diode units $21_{mn}$ belonging to the grade C are sequentially interchanged, as the aforementioned weight from one arraying position to another is taken into account. FIG. 13 shows the results of calculations of chromaticity difference Δx from one number of rows of the light emitting diode unit $21_{mn}$ of the grade C to another. The chromaticity difference Δx is the difference between the minimum chromaticity and the maximum chromaticity of the x-coordinates within the radiating surface of the white light radiated from the backlight unit 140.

As may be seen from the results shown in FIGS. 12 and 13, if, in arraying plural rows of the light emitting diode units $21_{mn}$, different in chromaticity, in the backlight enclosure 120, plural rows of the light emitting diode units $21_{mn}$ of the same chromaticity are juxtaposed, the difference in chromaticity in the light radiating surface of the white light radiated is increased with the result that variations in chromaticity may be represented strongly.

Figure 14:
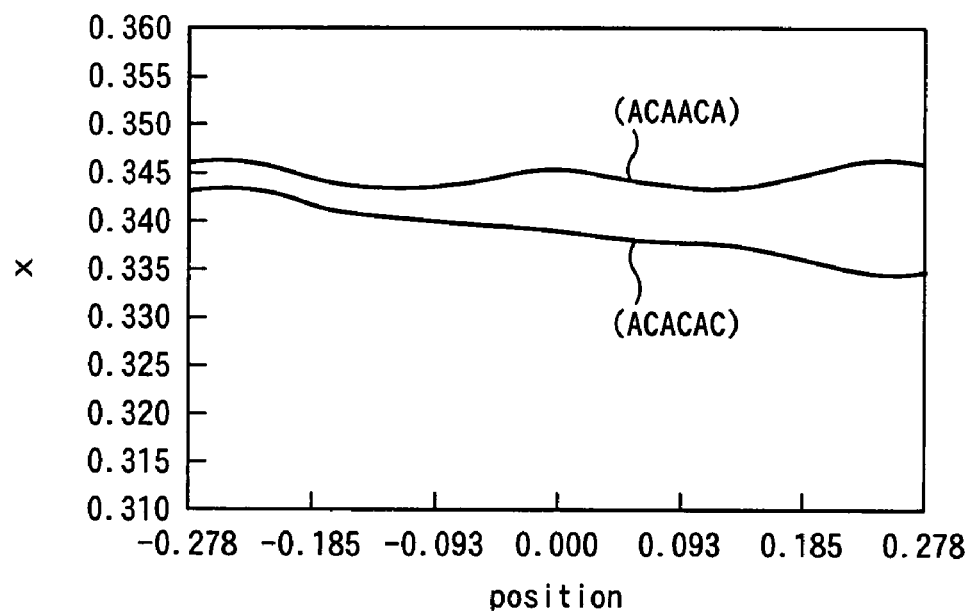
FIG. 14 is a graph showing chromaticity in the vertical direction of white light radiated from the backlight device (only x-coordinates), for each of two different arraying positions, in case of arraying a plural number of rows of subsidiary light emitting diode units.

Such an array is now scrutinized in which a plural number of the light emitting diode units $21_{mn}$ of the grade C arrayed are not juxtaposed. FIG. 14 shows the results of calculations of x-coordinates of chromaticity points at respective positions along the vertical direction of the backlight unit 140, for each of the following two cases, with the aforementioned weights for the respective arraying positions taken into account. One of the two cases is a case where the light emitting diode units $21_{mn}$ of the grade C are arrayed as $21_{21}$, $21_{41}$ and $21_{61}$, in alternation with the light emitting diode units of the grade A, and the other is a case where the light emitting diode units $21_{mn}$ of the grade C are arrayed as $21_{21}$ and $21_{51}$ in the second and fifth rows, respectively.

If, in arraying a plural number of rows of the subsidiary light emitting diode units $21_{mn}$, the rows of these subsidiary light emitting diode units are not arrayed with a sizeable distance from row to row, the light radiated from these light emitting diode units is not mixed with white light radiated from the principal light emitting diode units $21_{mn}$, as predominant light emitting diode units. Conversely, the chromaticity of the white light radiated from the subsidiary light emitting diode units $21_{mn}$ is represented in a congested state thus producing significant variations in chromaticity.

Moreover, as evidenced from the verified results for the case of arraying the sole subsidiary light emitting diode units $21_{mn}$, if the subsidiary light emitting diode unit is arrayed at an upper or lower extreme end of the backlight enclosure 120, the light reflected by the reflective function of the inner wall surface 120a of the backlight enclosure 120 of increasing the light utilization efficiency becomes so strong that the color may appear congested in the vicinity of the upper or lower extreme end of the backlight enclosure.

Conversely, if the light emitting diode units $21_{mn}$ of the grade C are arrayed in the second and fifth rows, that is, as the $21_{21}$ and $21_{51}$, the difference in chromaticity within the radiating surface of the radiated white light may become smaller than in case the light emitting diode units $21_{mn}$ of the grade C are arrayed every other row, with the result that the variations in chromaticity may be suppressed significantly.

Thus, if a row of the light emitting diode units $21_{mn}$ differing in the chromaticity grades are used as light source for the same backlight unit 140, the row of the minority light emitting diode units $21_{mn}$ in terms of chromaticity is arrayed not on the rim side but towards the center of the color liquid crystal display panel 110. In case plural rows of the minority light emitting diode units $21_{mn}$ in terms of chromaticity are arrayed, they are arrayed at a sizeable distance from each other, for example, every two rows. By so doing, it is possible to suppress variations in chromaticity in the array of the light emitting diode units.

<Case in which the Light Emitting Diode Units are Arrayed in a Two-Dimensional Matrix>

In the above example, the chromaticity-based arraying policy in case of arraying the light emitting diode units $21_{mn}$ in a one-dimensional matrix, as shown in FIG. 7, has been described. In the following, the chromaticity-based arraying policy in case of arraying the light emitting diode units $21_{mn}$ in a two-dimensional matrix is described.

In arraying the light emitting diode units $21_{mn}$ in a two-dimensional matrix within the backlight enclosure 120, such a case is to be scrutinized in which, for matching to a 46-inch color liquid crystal display panel 110, m and n of the light emitting diode units are set so that m=6 and n=3, that is, so that, with the horizontal direction of the color liquid crystal display panel 110 as the longitudinal direction, six rows by three columns of the light emitting diode units are arrayed.

Figure 15:
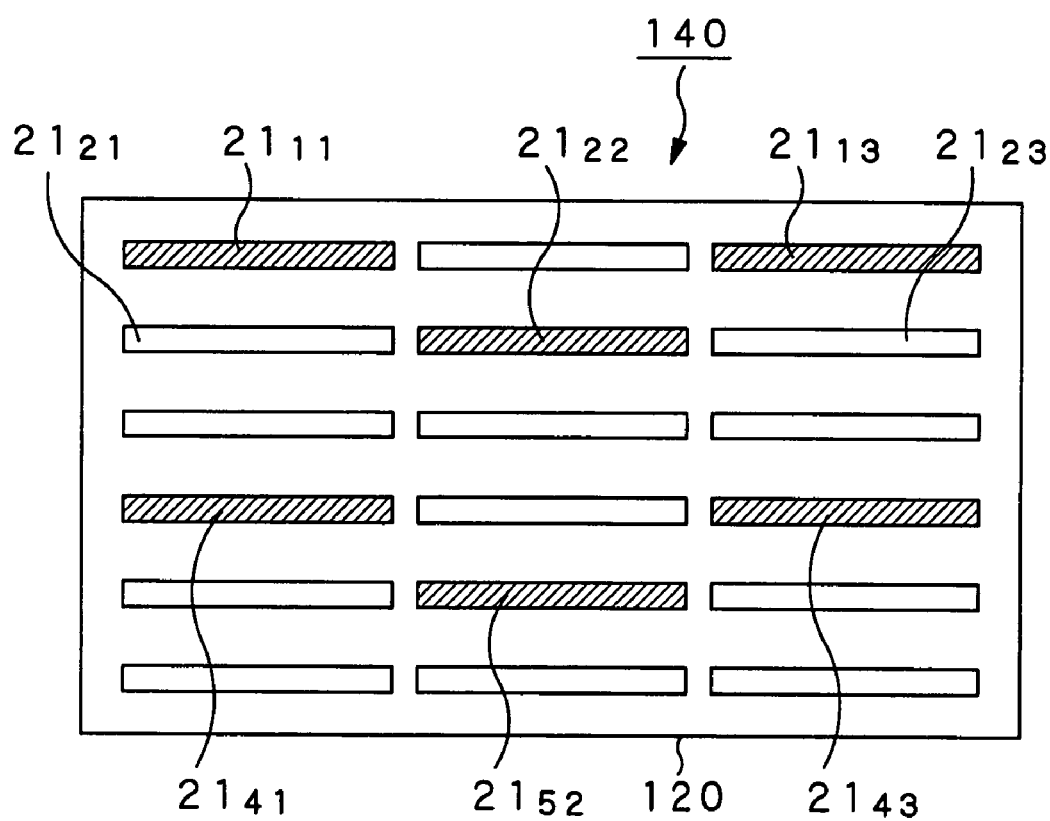
FIG. 15 is a diagram showing an example of arraying subsidiary light emitting diode units, based on chromaticity, in case of arraying light emitting diode units in a two-dimensional matrix pattern.
Figure 16:
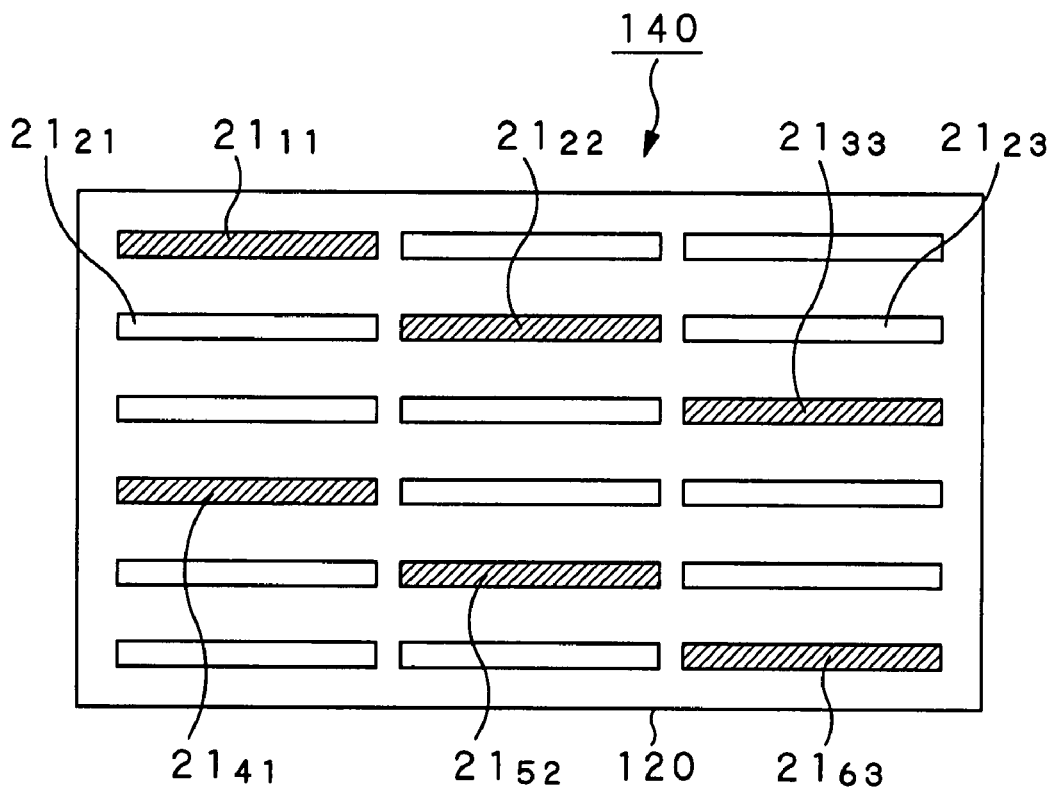
FIG. 16 is a diagram showing another example of arraying subsidiary light emitting diode units, based on chromaticity, in case of arraying light emitting diode units in a two-dimensional matrix pattern.

For example, if, in arraying the light emitting diode units $21_{mn}$ belonging to the grade B, out of the light emitting diode units $21_{mn}$, graded as shown in FIG. 7, all over the inside of the backlight enclosure 120, only six of the light emitting diode units $21_{mn}$ belonging to the grade A are arrayed, the resulting array is as shown in FIGS. 15 and 16.

In the case of FIG. 15, the light emitting diode units $21_{mn}$ belonging to the grade A are arrayed as light emitting diode units $21_{11}, 21_{41}, 21_{22}, 21_{52}, 21_{13}, 21_{43}$ in the backlight enclosure 120. In the case of FIG. 16, the light emitting diode units $21_{mn}$ belonging to the grade A are arrayed as light emitting diode units $21_{11}, 21_{41}, 21_{22}, 21_{52}, 21_{33}, 21_{63}$ in the backlight enclosure 120.

Referring to FIGS. 15 and 16, the light emitting diode units $21_{m2}$ in the second column, as a center column of the two-dimensional matrix, in the backlight enclosure 120 of the backlight unit 140, are arrayed in accordance with the arraying policy in arraying the plural rows in the one-dimensional matrix described above, that is, as $21_{22}, 21_{52}$. That is, the minority subsidiary light emitting diode units $21_{mn}$ are not arrayed at an upper extreme end or a lower extreme end of the backlight enclosure 120, but are arrayed at sizeable distances from one another. Here, the minority subsidiary light emitting diode units $21_{mn}$ are arrayed as $21_{22}, 21_{52}$, with the interposition of two rows of the light emitting diode units $21_{mn}$.

The first column of the light emitting diode units $21_{m1}$ and the third column of the light emitting diode units $21_{m3}$, arrayed on left and right sides of the inside of the backlight enclosure 120, respectively, differ from the light emitting diode units $21_{m2}$ in the second column. That is, in FIG. 15, the light emitting diode units $21_{11}, 21_{13}$ are arrayed at the upper extreme end of the backlight enclosure 120, whereas, in FIG. 16, the light emitting diode units $21_{11}, 21_{63}$ are arrayed at the upper and lower extreme ends of the backlight enclosure 120, respectively.

These arrays are used for averting the color being represented in congested state in the same column as the vertical direction and for averting the color being represented in congested state in the same row as the horizontal direction.

For example, if the light emitting diode units $21_{mn}$, belonging to the grade A chromaticity, are arrayed at the positions of $21_{21}, 21_{22}$ and $21_{23}$, the white light different in chromaticity in the horizontal direction is represented strongly about the second row as center, thus giving rise to variations in chromaticity. It is therefore necessary to avert light emitting diode units $21_{mn}$ being juxtaposed on the same row. This chromaticity-based arraying policy of not arraying the subsidiary light emitting diode units $21_{mn}$ on the same row is required in particular in case the size in inch of the color liquid crystal display panel 110 is enlarged such that it becomes necessary to array the light emitting diode units $21_{mn}$ in a two-dimensional matrix pattern.

In case the light emitting diode units $21_{mn}$ are arrayed in a two-dimensional matrix pattern, the horizontal length of the color liquid crystal display panel 110 is twice or more of the longitudinal length of the light emitting diode units $21_{mn}$ and hence the effect of the reflection from the inner wall surface 120a of the backlight enclosure 120 becomes correlatively smaller. Thus, in this case, the arraying policy of not arraying the light emitting diode units $21_{mn}$ of the same grade on the same row becomes higher in priority than the arraying policy of not arraying the light emitting diode units $21_{mn}$ at the upper or lower extreme ends of the backlight enclosure 120, described above with reference to the case of arraying the light emitting diode units $21_{mn}$ in the one-dimensional matrix pattern.

{Luminance-Based Arraying Policy

As for luminance, light emitting diode units $21_{mn}$ having two different sorts of luminance may be arrayed in the same backlight unit 140, as in the case of chromaticity.

The light emitting diode units $21_{mn}$, each formed by plural light emitting diodes 21, are classified according to luminance grades, as in the case of chromaticity, and light emitting diode units $21_{mn}$, having luminance difference within a preset range, are selected. The so selected light emitting diode units $21_{mn}$ are arrayed so that, when the color liquid crystal display panel 110 is illuminated, the center luminance will become higher. This represents the arraying policy in case of arraying the light emitting diode units $21_{mn}$ based on luminance.

It is assumed that, in case six rows of the light emitting diode units $21_{mn}$ are arrayed in the backlight enclosure 120, there are provided four light emitting diode units for higher luminance (H) and two light emitting diode units for lower luminance (L).

Figure 17:
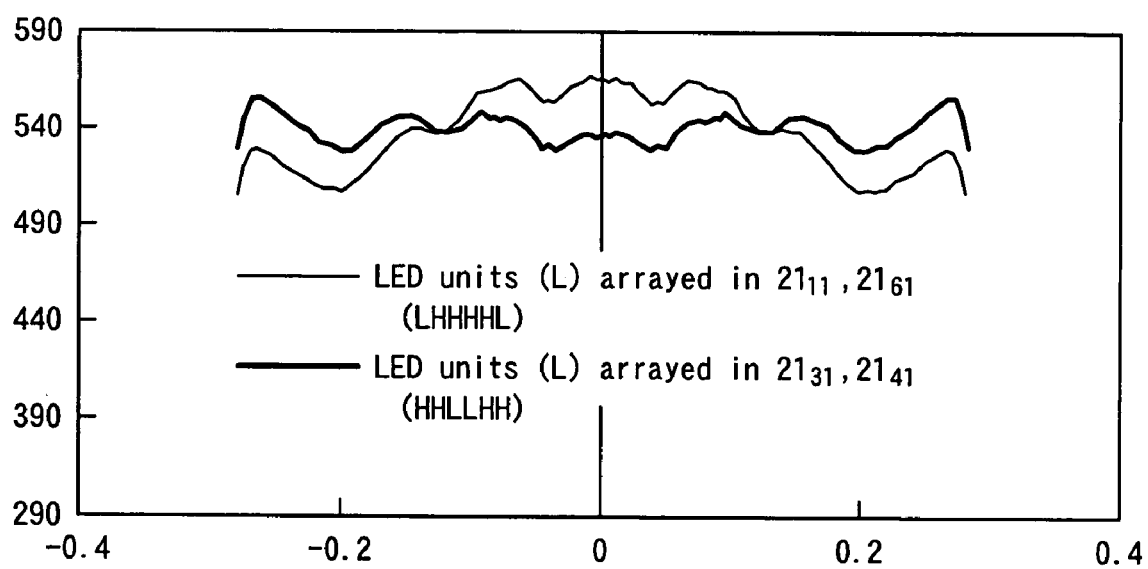
FIG. 17 is a graph showing luminance of white light radiated from the backlight device, for each of two different arraying positions, in case a plural number of rows of subsidiary light emitting diode units are arrayed.

FIG. 17 depicts a graph showing the luminance at respective positions along the vertical direction of the backlight unit 140 for a case where the light emitting diode units $21_{mn}$ of lower luminance (L) are arrayed at the positions of $21_{31}, 21_{41}$ and for a case where the light emitting diode units $21_{mn}$ of lower luminance (L) are arrayed at the positions of $21_{11}, 21_{61}$ in FIG. 6. The light emitting diode units $21_{mn}$ of lower luminance (L) are preferably arrayed at a rim part of the color liquid crystal display panel 110, that is, at the upper extreme end or at the lower extreme end of the backlight enclosure 120, as shown in FIG. 17. In such case, the luminance is improved by 6.8% as compared to the case in which the light emitting diode units $21_{mn}$ of lower luminance (L) are arrayed at the center.

The same arraying policy applies for a case where the light emitting diode units $21_{mn}$ are arrayed in a two-dimensional matrix pattern within the backlight enclosure 120, based on luminance.

In arraying the light emitting diode units $21_{mn}$ in a two-dimensional matrix within the backlight enclosure 120, such a case is to be scrutinized in which, for matching to a 46-inch color liquid crystal display panel 110, m and n of the light emitting diode units $21_{mn}$ are set so that m=6 and n=3, that is, so that, with the horizontal direction of the color liquid crystal display panel 110 as the longitudinal direction, six rows by three columns of the light emitting diode units are arrayed.

Figure 18:
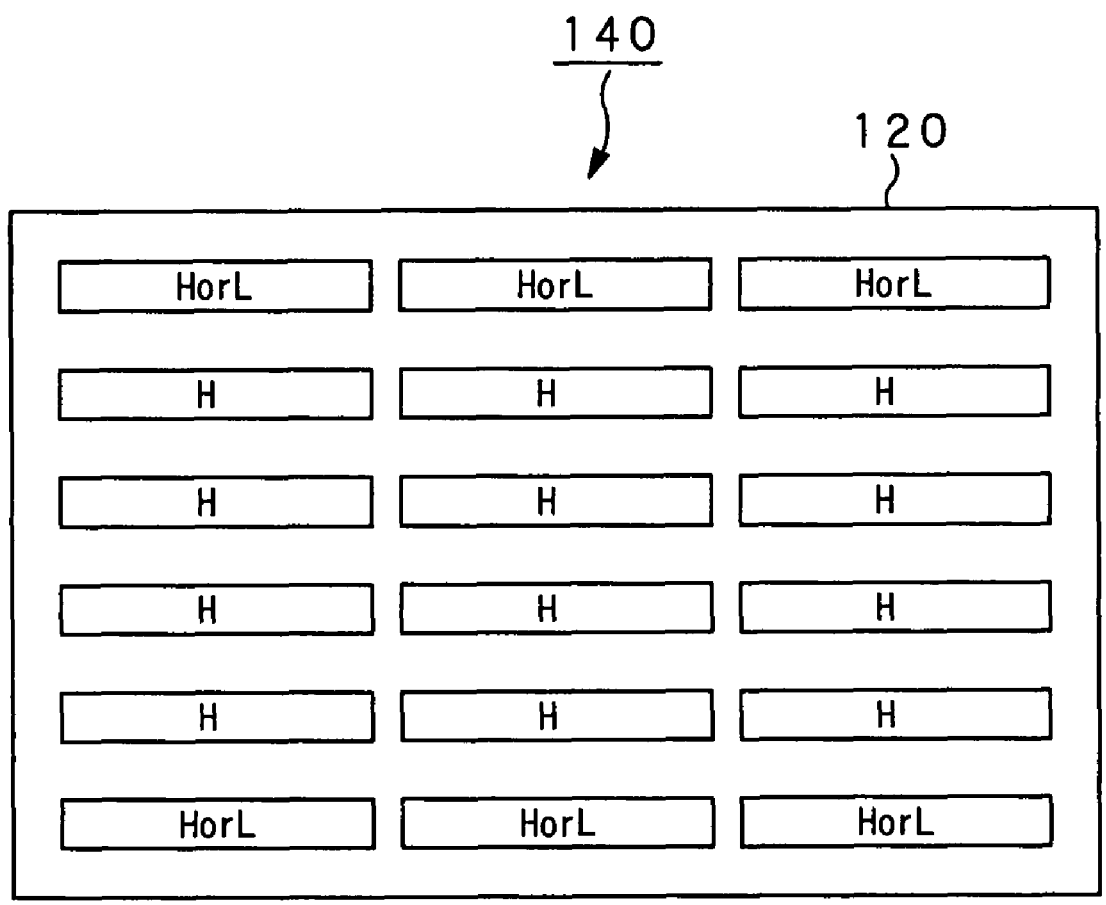
FIG. 18 is a diagram showing an example of arraying subsidiary light emitting diode units, based on luminance, in case of arraying light emitting diode units in a two-dimensional matrix pattern.

If the above-described luminance-based arraying policy is followed, the light emitting diode units $21_{mn}$ of lower luminance (L) are arrayed at the upper or lower extreme end within the backlight enclosure 120 of the backlight unit 140, as shown in FIG. 18. By illuminating the color liquid crystal display panel 110 with the backlight unit 140, having such array of the light emitting diode units $21_{mn}$, it is possible to display an image which is visually optimum and which has high center luminance.

If, in this manner, the chromaticity-based arraying policy and the luminance-based arraying policy are combined together, the light emitting diode units $21_{mn}$, graded based on chromaticity, may further be classified into high luminance light emitting diode units and low luminance light emitting diode units based on luminance. Thus, the principal light emitting diode units $21_{mn}$ and the subsidiary light emitting diode units $21_{mn}$, selected from the two different chromaticity grades for arraying in the backlight enclosure 120, are classified into high luminance light emitting diode units and low luminance light emitting diode units. Consequently, when the chromaticity-based arraying policy and the luminance-based arraying policy are used in combination, a sum of four sorts of the light emitting diode units $21_{mn}$ are arrayed in the same backlight unit 140.

Out of the subsidiary light emitting diode units $21_{mn}$, the light emitting diode units $21_{mn}$, low in luminance, are arrayed towards the center of the color liquid crystal display panel 110, based on chromaticity, or towards the rim thereof, based on luminance.

As described above, the light emitting diode units $21_{mn}$, each prepared from plural light emitting diodes 21, variable in luminance and chromaticity of white light, emitted thereby, to preset targeted chromaticity and luminance, are used as light source for the backlight unit 140. A number of the light emitting diode units $21_{mn}$, thus prepared, are then arrayed such as to simultaneously satisfy the aforementioned chromaticity-based arraying policy and luminance-based arraying policy. This allows for non-wasteful use of light emitting diode units $21_{mn}$, so far prepared but not used, in such a manner that variations in luminance or in chromaticity are not produced. The result is that manufacture costs of the backlight unit 140 and hence the transmissive color liquid crystal display apparatus 100 may appreciably be reduced.

The present invention is not limited to the above embodiments described above with reference to the drawings. It is to be appreciated that those skilled in the art can change or modify the embodiments without departing from the scope and spirit of the invention.

The invention claimed is:

1. A backlight device for illuminating a transmissive color liquid crystal display panel with white light from a backside thereof, said backlight device comprising, as a light source:
   a plurality of first principal light emitting device strings, each of said strings being a string of a plurality of light emitting devices emitting white light of preset luminance and preset chromaticity;
   a plurality of second principal light emitting device strings, each of said strings being a string of a plurality of light emitting devices emitting white light of luminance lower than said preset luminance and preset chromaticity; a number of said second principal light emitting device strings being smaller than a number of said first principal light emitting device strings;
   a plurality of first subsidiary light emitting device strings, each of said strings being a string of a plurality of light emitting devices emitting white light of said preset luminance and chromaticity in a first vicinity of said preset chromaticity; a number of said first subsidiary light emitting device strings being smaller than the number of said first principal light emitting device strings; and
   a plurality of second subsidiary light emitting device strings, each of said strings being a string of a plurality of light emitting devices emitting white light of luminance lower than said preset luminance and chromaticity in a second vicinity of said preset chromaticity; a number of said second subsidiary light emitting device strings being smaller than the number of said first subsidiary light emitting device strings; wherein
   when said first principal light emitting device strings, second principal light emitting device strings, first subsidiary light emitting device strings and said second subsidiary light emitting device strings are arrayed in a one-dimensional matrix pattern in a vertical direction of said color liquid crystal display panel, with a horizontal direction of said color liquid crystal display panel being a longitudinal direction, said first subsidiary light emitting device strings are arrayed within said color liquid crystal display panel, based on chromaticity, said second principal light emitting device strings being arrayed within said color liquid crystal display panel, based on luminance; and wherein said second subsidiary light emitting device strings are arrayed within said color liquid crystal display panel based on chromaticity or within said color liquid crystal display panel, based on luminance.

2. The backlight device according to claim 1 wherein, when two or more rows of said first or second subsidiary light emitting device strings are arrayed, said first or second subsidiary light emitting device strings are arrayed with an interposition of a preset number of said first principal light emitting device strings.

3. A backlight device for illuminating a transmissive color liquid crystal display panel with white light from a backside thereof, said backlight device comprising, as a light source:
   a plurality of first principal light emitting device strings, each of said strings being a string of a plurality of light emitting devices emitting white light of preset luminance and preset chromaticity;
   a plurality of second principal light emitting device strings, each of said strings being a string of a plurality of light emitting devices emitting white light of luminance lower than said preset luminance and preset chromaticity; a number of said second principal light emitting device strings being smaller than a number of said first principal light emitting device strings;
   a plurality of first subsidiary light emitting device strings, each of said strings being a row of a plurality of light emitting devices emitting white light of said preset luminance and chromaticity in a first vicinity of said preset chromaticity; a number of said first subsidiary light emitting device strings being smaller than the number of said first principal light emitting device strings; and
   a plurality of second subsidiary light emitting device strings, each of said strings being a string of a plurality of light emitting devices emitting white light of luminance lower than said preset luminance and chromaticity in a second vicinity of said preset chromaticity; a number of said second subsidiary light emitting device strings being smaller than the number of said first subsidiary light emitting device strings; wherein
   when said first principal light emitting device strings, second principal light emitting device strings, first subsidiary light emitting device strings and said second subsidiary light emitting device strings are arrayed in a two-dimensional matrix pattern, with a horizontal direction of said color liquid crystal display panel being a longitudinal direction, said first subsidiary light emitting device strings are arrayed without being juxtaposed on the same row, based on chromaticity; said first subsidiary light emitting device strings arrayed at center columns of said two-dimensional matrix being arrayed towards a center of said color liquid crystal display panel; wherein said second principal light emitting device strings are arrayed within of said color liquid crystal display panel, based on luminance; and wherein said second subsidiary light emitting device strings are arrayed within said color liquid crystal display panel, without being juxtaposed on the same row, based on chromaticity, or are arrayed within said color liquid crystal display panel, based on luminance.

4. The backlight device according to claim 3 wherein, when two or more rows of said first and second subsidiary light emitting device strings are arrayed on the same columns in a two-dimensional matrix, said first and second subsidiary light emitting device strings are arrayed with an interposition of a preset number of said first principal light emitting device strings based on chromaticity.

* * * * *